United States Patent

[11] 3,604,273

| [72] | Inventors | Clyde Chi Kai Kwok<br>Montreal, Quebec;<br>Zigmas Juozas Lapinas, Chomedy, Quebec;<br>Theo Guenter Heilmann, St. Laurent,<br>Quebec, all of, Canada |
|---|---|---|
| [21] | Appl. No. | 778,727 |
| [22] | Filed | Nov. 25, 1968 |
| [45] | Patented | Sept. 14, 1971 |
| [73] | Assignee | Aviation Electric Limited<br>Montreal PQ, Canada |

[54] ANGULAR RATE SENSOR
12 Claims, 9 Drawing Figs.

[52] U.S. Cl. ..................................................... 73/505,
73/516 LM
[51] Int. Cl. .............................................. G01p 15/02
[50] Field of Search........................................ 73/505,
515, 194; 137/81.5

[56] References Cited
UNITED STATES PATENTS

| 3,285,073 | 11/1966 | Egli ............................. | 73/505 |
| 3,320,815 | 5/1967 | Bowles ......................... | 73/505 |
| 3,420,109 | 1/1969 | Dexter........................... | 73/505 |
| 3,436,969 | 4/1969 | Phillips......................... | 73/505 |

*Primary Examiner*—James J. Gill
*Attorney*—Stevens, Davis, Miller and Mosher

ABSTRACT: This application discloses an angular rate sensor. The sensor comprises a cylindrical chamber adapted to take part in the angular movement to be sensed, fluid discharge means in the peripheral wall of the chamber by which fluid is in use discharged into the chamber with a component of velocity relative to the chamber wall and in a direction tangential to the chamber wall which is determined by the velocity of rotation of the cylindrical chamber about the axis of that chamber, an axial outlet from the chamber for the throughflow of fluid entering the chamber through the peripheral wall, and port means associated with the axial outlet and exposed to the fluid flow through that outlet in such a manner that the pressure developed in the port means is indicative of the direction and the magnitude of the tangential component of the velocity of the fluid passing into the axial outlet, the effective axial outlet from the chamber being annular in form and defined by an outer wall and by an inner boundary which extends axially through the chamber.

ANGULAR RATE SENSOR

This invention relates to angular rate sensors, i.e. to devices adapted to provide an indication or a measure of the angular rate at which a body is rotating about a given axis.

The invention can be applied to the measurement of the rate of angular rotation of any body to which it is attached, but a particular use of the invention is as a sensor which is carried by a vehicle and is adapted to indicate the rate of angular rotation of the vehicle about a selected axis. Thus three such sensors could be used to measure, or to provide an indication of, the rate of rotation of the body about three mutually perpendicular axes.

An object of the invention is the provision of an angular rate sensor which includes no moving parts and which does not require any transducer or electronic equipment for its operation, although in some cases a transducer will be used to transform the output of the sensor into a form suitable for application to other items of equipment.

According to the present invention an angular rate sensor comprises a cylindrical chamber adapted to take part in the angular movement to be sensed, fluid discharge means in the peripheral wall of the chamber by which fluid is in use discharged into the chamber with a component of velocity which is tangential to the chamber wall and with a magnitude which is determined by the velocity of rotation of the cylindrical chamber about the axis of that chamber, an axial outlet from the chamber for the through flow of fluid entering the chamber through the peripheral wall, and port means associated with the axial outlet and exposed to the fluid flow through that outlet in such a manner that the pressure developed in the port means is indicative of the direction and the magnitude of the tangential component of the velocity of the fluid passing into the axial outlet.

FIG. 3 is a plan view taken on the line III—III of FIG. 1 and showing only a small part of the sensor.

Figure 1:
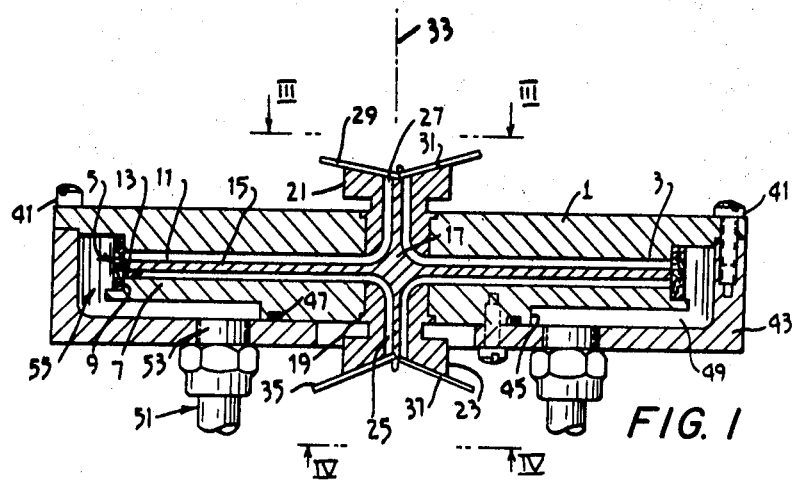
FIG. 1 is a sectional side elevation of an angular—rate sensor.
Figure 2:
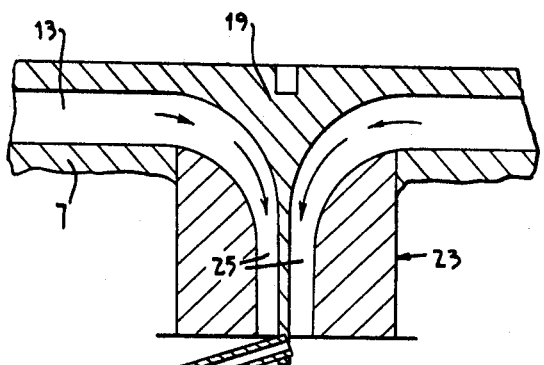

Referring first to FIG. 1, the angular rate sensor includes a base plate 1 formed on one side with a circular boss 3 about the periphery of which fits one end of a ring 5 formed of porous material. The other end of the ring is closed by an end plate 7 having a circular boss 9 on one side which fits within this end of the ring. The space between boss 3 and boss 9 is divided into two vortex chambers 11 and 13, each of small axial extent, by a rigid diaphragm or partition 15 which fits closely against and is rigidly secured to the ring 5 and which is spaced from both the bosses. Two aligned cores 17 and 19 are attached to the partition 15 respectively on opposite sides thereof, and these extend respectively into an exhaust insert 21 carried by the base plate 1 and into an exhaust insert 23 carried by the end plate 7. Insert 23 is formed with a bore which forms an axial outlet 25 which is aligned with the central axis of the two vortex chambers 11 and 13, and as a result of the presence of the core 19 this outlet is in the form of an annular space of streamline contour. The shaping of the core 19 which provides this streamline contour can be seen most clearly in FIG. 2. Insert 21 is similarly formed with a bore which forms an axial outlet 27.

At its outward end the exhaust insert 21 carries two pitot tubes 29 and 31 the ends of which lie on opposite sides of the core so that they are both directed in the same clockwise direction (view from above in FIG. 1) into the annular fluid flow space between the core 17 and the insert 21. Similarly, at its outward end the exhaust insert 23 carries two pitot tubes 35 and 36 the ends of which lie on opposite sides of the core so that they are both directed in the same anticlockwise direction (viewed from above in FIG. 1) into the annular fluid flow space between the core 19 and the insert 23.

Secured to base plate 1 by screws 41 is a cover 43 in the form of a shallow dish which fits against and is sealed to a boss 45 on end plate 7 by a sealing ring 47. Between cover 43 and the part of end plate 7 surrounding the boss 45 is an annular space 49 to which fluid under pressure is admitted continuously in use through a pipe 51 coupled to a nozzle 53 carried by the cover 43. This annular space 49 communicates along the whole of its periphery with an annular plenum chamber 55 bounded on its inner side by the porous ring and on its outer side by the cover 43.

Figure 3:
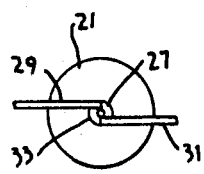
FIG. 3 is a fragmentary drawing of a fluid outlet shown in FIG. 1, but is drawn to a much larger scale than in that Figure.
Figure 4:
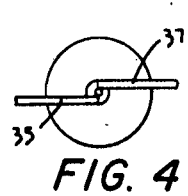
FIG. 4 is an underneath view taken on the line IV—IV of FIG. 1 and showing only a small part of the sensor.
Figure 5:
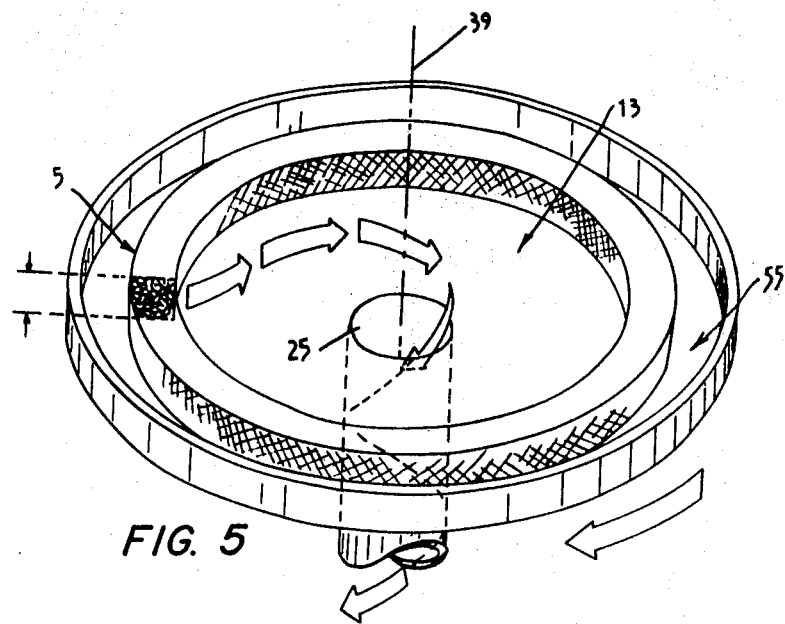
FIG. 5 is a diagrammatic representation of a lower vortex chamber shown in FIG. 1, and illustrates its method of operation.
Figure 6:
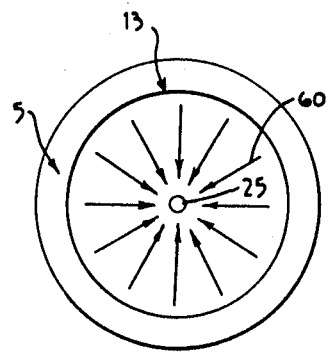
FIGS. 6 and 7 are diagrammatic representations in the form of plan views of the lower vortex chamber shown in FIG. 1, and illustrate fluid flow therein under conditions respectively of no angular rotation and of clockwise angular rotation.
Figure 7:
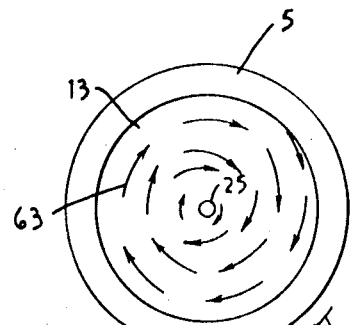

The operation of the angular rate sensor will now be explained with reference to FIGS. 5, 6 and 7. When a continuous stream of gaseous fluid is supplied to the annular plenum chamber 55 at a suitable pressure, it percolates through the porous ring 5 and is released at the inner surface of the ring with radial velocity plus a tangential velocity equal to the tangential velocity of the inner surface of the ring 5. As a result of the pressure drop between this inner surface of the ring 5 and the axially outer end of the outlets 25 and 27 (which are at atmospheric pressure), this gas attempts to flow radially through the vortex chamber 11 or 13 towards the associated outlet 25 or 27. When the ring 5 has zero angular velocity about the aligned axes 33 and 39 of the two chambers 11 and 13, the fluid will flow in a purely radial manner as indicated by arrows 60 in FIG. 6 to the associated outlet. However, if the ring 5 has an angular velocity about these axes in the sense indicated by the arrow 61 in FIG. 7, a molecule of fluid with a certain momentum due to its tangential velocity at the periphery of the vortex chamber will increase its angular velocity (conservation of momentum) as it approaches the center of the chamber, and so will accelerate relative to the chamber as a whole in the direction indicated by the arrows 63. Thus although the whose sensor may be rotating, including the two pitot tubes associated with that vortex chamber, the fluid passing axially through the outlets 25 and 27 will flow circumferentially in the outlets past the free ends of the pitot tubes. With the arrangement shown in FIGS. 1 to 3, for one sense of rotation an increased pressure will be generated in the pitot tubes 29 and 31 while by the entrainment of gas molecules a reduction in pressure will be generated in the pitot tubes 35 and 37. For the opposite sense of rotation, an increased pressure will be generated in the pitot tubes 35 and 37 while a reduction in pressure will be generated in pitot tubes 29 and 31. The increase in pressure, and the reduction in pressure, will be related to the angular velocity of the ring 5 and thus the angular velocity of the sensor.

Figure 8:
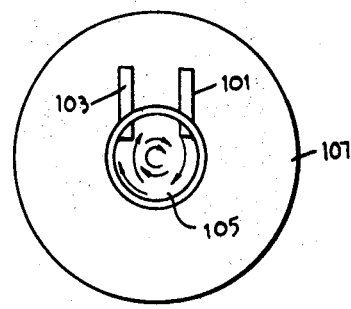
FIG. 8 is an underneath view of an alternative arrangement of the fluid outlet shown in FIG. 4.
Figure 9:
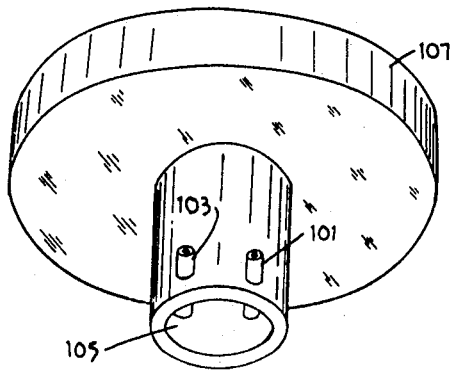
FIG. 9 is a perspective drawing showing the spatial arrangement of items shown in FIG. 8.

Referring now to FIGS. 8 and 9, in the modification shown therein two pitot tubes 101 and 103 are arranged to extend in opposite senses into a single axial outlet 105 from a vortex chamber 107 formed as described above with connection with vortex chambers 11 and 12. With such an arrangement, it is no longer necessary to utilize a double arrangement such as that shown in FIG. 1, in which the fluid flow in one axial outlet is used to provide a positive pressure increase upon rotation in one sense and the fluid flow in a second axial outlet is used to provide a positive pressure increase upon rotation in the opposite sense. In the arrangement of FIGS. 8 and 9, one can still combine the effects of the increase in pressure in one pitot tube with the decrease in pressure in the other pitot tube.

It has been found that the central core 17 or 19 considerably improves the performance of the sensor. In practically all vortex flows, the core of the swirl flow through the exhaust orifice is subject to random lateral movement. The introduction of the pitot tubes causes a distortion of the flow pattern, which further emphasizes this random movement. By the introduction of a solid central core, the core of the vortex flow is laterally stabilized. A central low pressure region is inherent in all vortex flow phenomena, and consequently the static pressure is very low near the center of the vortex. As a result, the flow in the annular axial outlet demonstrates a strong tendency to attach itself to the central solid core. Vortex rate sensors incorporating this configuration have achieved very low threshold limits.

An alternative to the porous ring 5 is a similar ring provided with circumferentially distributed radial slots which act in a manner analogous to that of the pores in the ring illustrated.

The sensor shown provides as an output at least one fluid pressure derived from a pitot tube exposed to the fluid flow in the axial outlet. In a fluidic control system, this pressure can be used directly in amplifiers and in other logic devices. The sensor can also be used in electrical and electronic logic systems by applying the pressure in the pitot tube to a suitable electromechanical transducer to provide an electrical or electronic output which can be coupled to the desired circuit.

Merely by way of example, the following dimensions and other data are given for one working embodiment of the invention:

| | |
|---|---|
| Diameter of the vortex chamber | 5 inches |
| Inner diameter of the annular outlet | one-eighth inch |
| Axial length of the vortex chamber | one-eighth inch |
| Material used for the ring 5 | radially slotted aluminum |
| Slot size in the ring 5 | one thirty-second inch wide |
| Fluid used | air or kerosene |
| Rate of fluid flow | 1 to 4 s.c.f.m. |
| Supply pressure | 1 to 15 p.s.i.g. (air) |
| Threshold angular velocity sensed | 0.05° per second |

The embodiments of the invention in which an exclusive property or privilege is claimed are defined as follows:

1. In an angular rate sensor comprising:
   a. a cylindrical chamber adapted to take part in an angular movement to be sensed;
   b. fluid discharge means in the peripheral wall of the chamber by which fluid is in use discharged into the chamber with a velocity which is radial relative to the said wall;
   c. axial outlet means leading from the center of the chamber for the throughflow of fluid entering the chamber through the peripheral wall
   d. port means associated with the said axial outlet means and providing as fluid pressures an indication of the angular direction of flow and angular rate of flow of fluid passing through the axial outlet means; the improvement comprising:
   e. a single axial outlet extends in one direction only away from the said chamber;
   f. a circular outer wall, and a concentric circular inner wall, between them define the single axial outlet as an annular passage; and
   g. the said port means are disposed within the said annular passage.

2. An angular rate sensor according to claim 1, and in which:
   a. the diameter of the said circular inner wall decreases progressively along an initial part of the length of the said outlet in a flow wise direction;
   b. the diameter of the said circular outer wall decreases progressively along an initial part of the length of the said outlet in a flow wise direction, and
   c. the flow area of the said outlet changes progressively to provide a streamline flow of the fluid in the outlet.

3. An angular rate sensor according to claim 1, and in which:
   a. the said inner wall extends through the said chamber into the said outlet;
   b. the said inner wall over a part of its length within the chamber is of progressively changing diameter to provide a curved guiding surface which will produce in operating a streamline flow of fluid from the chamber into the outlet.

4. An angular rate sensor as claimed in claim 1, wherein the discharge means in the peripheral wall consist of porous wall sections through which the fluid is discharged.

5. An angular rate sensor as claimed in claim 1, wherein the peripheral wall is porous in structure and the fluid is discharged through the wall.

6. An angular rate sensor as claimed in claim 5, wherein the peripheral wall is surrounded by an annular plenum chamber to which the fluid is supplied under pressure for discharge through the wall.

7. Angular rate sensor means comprising a first angular rate sensor according to claim 1 and a second angular rate sensor according to claim 1, the port means associated with the first angular rate sensor providing an output fluid pressure which increases with increased angular rate in a first sense, and the port means associated with the second angular rate sensor providing an output fluid pressure which increases with increased angular rate in the second opposite sense.

8. Angular rate sensor means as claimed in claim 7, wherein the chamber of the first sensor and the chamber of the second sensor are formed by the two spaces respectively on opposite sides of a partition which at its periphery abuts a ring forming the chamber wall of the first chamber and the chamber wall of the second chamber.

9. Angular rate sensor means as claimed in claim 8, wherein the ring forming the peripheral wall of each chamber is surrounded by an annular plenum chamber to which the fluid is supplied under pressure for discharge through the wall.

10. Angular rate sensor means as claimed in claim 9 wherein the ring is porous or channelled in structure and the fluid is discharged through the ring.

11. In an angular rate sensor comprising:
   a. a cylindrical chamber adapted to take part in an angular movement to be sensed;
   b. fluid discharge means in the peripheral wall of the chamber by which fluid is in use discharged into the chamber with a velocity which is radial relative to the said wall;
   c. axial outlet means leading from the center of the chamber for the throughflow of fluid entering the chamber through the peripheral wall;
   d. port means associated with the said axial outlet means and providing as fluid pressures an indication of the angular direction of flow and angular rate of flow of fluid passing through the axial outlet means; the improvement comprising:
   e. a single axial outlet extends in one direction only away from the said chamber;
   f. a circular outer wall, and a concentric inner wall, between them define the single axial outlet as an annular passage;
   g. the said port means are disposed within the said annular passage;
   h. a first port, part of the said port means, is directed in a first sense circumferentially of the annular axial outlet; and
   i. a second port, part of the said port means, is directed in a second sense circumferentially of the annular axial outlet; whereby for one direction of rotary flow in the said annular outlet passage a positive pressure is produced in the first port and a negative pressure is produced in the second port; while for a second opposite direction of rotary flow in the said annular outlet passage a negative pressure is produced in the said first port and a positive pressure is produced in the said second port.

12. In an angular rate sensor comprising:
a. a cylindrical chamber adapted to take part in an angular movement to be sensed;
b. fluid discharge means in the peripheral wall of the chamber by which fluid is in use discharged into the chamber with a velocity which is radial relative to the said wall;
c. axial outlet means leading from the center of the chamber for the throughflow of fluid entering the chamber through the peripheral wall;
d. port means associated with the said axial outlet means and providing as fluid pressures an indication of the angular direction of flow and angular rate of flow of fluid passing through the axial outlet means; the improvement comprising:
e. a single axial outlet extending in one direction only away from the said chamber;
f. means arranged to exclude said fluid passing through the axial outlet means from a cylindrical central portion of the axial outlet means, to define an annular flow passage for discharged fluid; and
g. a circular outer wall concentric with said cylindrical central portion of the axial outlet means, and defining the periphery of the said annular passage, the said port means being disposed within the said annular passage.